US008258066B2

(12) United States Patent
Michaels et al.

(10) Patent No.: US 8,258,066 B2
(45) Date of Patent: Sep. 4, 2012

(54) CLEANING DEVICE

(75) Inventors: Emily W. Michaels, Greenville, SC (US); Dominick J. Valenti, Greer, SC (US); Diana C. Balasca, Simpsonville, SC (US); Eduardo Torres, Boiling Springs, SC (US)

(73) Assignee: Milliken & Company, Spartanburg, SC (US)

(*) Notice: Subject to any disclaimer, the term of this patent is extended or adjusted under 35 U.S.C. 154(b) by 35 days.

(21) Appl. No.: 11/394,963

(22) Filed: Mar. 31, 2006

(65) Prior Publication Data

US 2007/0135006 A1 Jun. 14, 2007

Related U.S. Application Data

(60) Provisional application No. 60/749,554, filed on Dec. 12, 2005.

(51) Int. Cl.

| | |
|---|---|
| ***B32B 27/14*** | (2006.01) |
| ***B32B 27/12*** | (2006.01) |
| ***B32B 7/02*** | (2006.01) |
| ***B32B 27/32*** | (2006.01) |
| ***D06N 7/04*** | (2006.01) |

(52) U.S. Cl. .......... 442/73; 442/121; 442/152; 442/164; 428/143; 428/144; 428/217; 428/220

(58) Field of Classification Search .................... 442/69, 442/73, 121, 152, 164; 428/143–144, 217, 428/220
See application file for complete search history.

(56) References Cited

U.S. PATENT DOCUMENTS

| | | | | |
|---|---|---|---|---|
| 3,711,884 | A | 1/1973 | Feig | 15/104.93 |
| 3,956,162 | A | 5/1976 | Lautenberger | 252/162 |
| 4,434,067 | A | 2/1984 | Malone et al. | 252/88 |
| 4,833,003 | A | 5/1989 | Win et al. | 428/198 |
| 4,842,619 | A * | 6/1989 | Fritz et al. | 51/295 |
| 4,908,149 | A | 3/1990 | Moore et al. | 252/139 |
| 5,213,588 | A | 5/1993 | Wong et al. | 51/293 |
| 5,683,971 | A | 11/1997 | Rose et al. | 510/130 |
| 5,786,065 | A | 7/1998 | Annis et al. | 428/141 |

(Continued)

FOREIGN PATENT DOCUMENTS

EP 0 671 448 A1 3/1995 ........................ 133/6

(Continued)

OTHER PUBLICATIONS

International Search Report—PCT/US2006/047397—International filing date Dec. 12, 2006. Mailing date May 21, 2007.

(Continued)

*Primary Examiner* — Lynda Salvatore
(74) *Attorney, Agent, or Firm* — Brenda D. Wentz

(57) ABSTRACT

This invention relates to a cleaning device comprising a cleaning composition and a substrate. The cleaning composition comprises an absorbent particulate, a binding agent, and optionally, a thickening agent. The cleaning composition may be applied to a substrate, such as a textile substrate, by applying the composition to at least one portion of the surface of the substrate or by incorporating the composition throughout the substrate. The absorbent particulate generally exhibits a high affinity for particles, color, grease, oil, and other staining materials and is a soft material which allows for gentle cleaning of most surfaces without detrimentally abrading and scratching soiled surfaces. The absorbent particulate also serves as an indicator providing a visual cue of its cleaning efficacy and may be used in either a wet or dry state.

15 Claims, 2 Drawing Sheets

U.S. PATENT DOCUMENTS

| | | | | |
|---|---|---|---|---|
| 6,340,663 | B1 | 1/2002 | Deleo et al. | 510/438 |
| 6,503,615 | B1 | 1/2003 | Horii et al. | 428/316.6 |
| 6,756,450 | B2 | 6/2004 | Marinow | 525/333.7 |
| 6,758,727 | B2 * | 7/2004 | Coad | 451/41 |
| 6,841,527 | B2 | 1/2005 | Mitra et al. | 510/295 |
| 6,910,823 | B2 | 6/2005 | Policicchio et al. | 401/138 |
| 6,916,480 | B2 | 7/2005 | Anderson et al. | 424/404 |
| 6,930,080 | B2 | 8/2005 | Moodycliffe et al. | 510/295 |
| 6,951,834 | B2 | 10/2005 | Mitra et al. | 510/295 |
| 6,964,726 | B2 | 11/2005 | Chen et al. | 162/134 |
| 6,986,897 | B1 | 1/2006 | Roberts et al. | 424/402 |
| 7,494,512 | B2 * | 2/2009 | Brown et al. | 8/137 |
| 2004/0242133 | A1 | 12/2004 | Arellano et al. | 451/108 |
| 2005/0107282 | A1 | 5/2005 | Ford et al. | 510/438 |
| 2005/0113277 | A1 | 5/2005 | Sherry et al. | 510/438 |
| 2005/0121054 | A1 | 6/2005 | Barnabas et al. | 134/6 |

FOREIGN PATENT DOCUMENTS

| | | | |
|---|---|---|---|
| EP | 0/938862 | 9/1999 | |
| EP | 1 410 753 A1 | 7/2001 | 17/6 |
| FR | 2 015 972 | 4/1970 | |
| GB | 714574 | 9/1954 | |
| GB | 1/117216 | 6/1968 | |
| WO | 97/42005 | 5/1990 | |
| WO | 98/26040 | 6/1998 | |
| WO | 03/037292 | 5/2003 | |

OTHER PUBLICATIONS

AATCC Technical/1993, AATCC Test Method 122-1989. Carpet Soiling: Service Soiling Method. pp. 206-207.

AATCC Technical/1993, AATCC Test Method 175—1992. Stain Resistance: Pile Floor Coverings. pp. 334-336.

ASTM International, D281-95. Standard Test Method for Oil Absorption of Pigments by Spatula Rub-Out. pp. 10-11.

ASTM International. D 4488-95. Standard Guide for Testing Cleaning Performance of Products Intended for Use on Resilient Flooring and Washable Walls. pp. 1-15.

American Association of Textile Chemists and Colorists. Objective Instrumental Shade Sorting. Richard Harold. pp. 155-161.

* cited by examiner

CLEANING DEVICE

CROSS REFERENCE TO RELATED APPLICATIONS

This application claims priority to U.S. Provisional Patent Application No. 60/749,554, entitled "Textile Substrate Containing Urea Formaldehyde Polymer" which was filed on Dec. 12, 2005.

TECHNICAL FIELD

This invention relates to a cleaning device comprising a cleaning composition and a substrate. The cleaning composition comprises an absorbent particulate, a binding agent, and optionally, a thickening agent. The cleaning composition may be applied to a substrate, such as a textile substrate, by applying the composition to at least one portion of the surface of the substrate or by incorporating the composition throughout the substrate. The absorbent particulate generally exhibits a high affinity for particles, color, grease, oil, and other staining materials and is a soft material which allows for gentle cleaning of most surfaces without detrimentally abrading and scratching soiled surfaces. The absorbent particulate also serves as an indicator providing a visual cue of its cleaning efficacy and may be used in either a wet or dry state.

BACKGROUND

Treated substrates, such as textile substrates, for use as cleaning wipes are known in the prior art. There are numerous examples in the patent literature of cleaning compositions and cleaning wipes treated therewith.

For example, GB 0014574 to Sereny describes a flexible article useful as a washing or cleaning cloth. The article is comprised of a sheet of paper impregnated with a wet strength agent which provides increases strength to the article when wet and which leaves the article fully flexible. The wet strength agent is a polymerized resin such as melamine or urea formaldehyde.

WO 97/42005 to Beardsley et al. discloses a nonwoven abrasive article which includes fine abrasive particles adhered to the fibers of the article in specific distribution pattern. Urea formaldehyde resin may be used as an adhesive material for holding the fine abrasive particles on the surface of the nonwoven article. The articles are useful in abrasive applications such as the finishing and polishing of metal, wood and plastic surfaces.

EP 1410753 A1 to Maldonado et al. discloses an abrasive cleaning article having fine abrasive particles (e.g. aluminum oxide) and microencapsules of an aromatizing substance contained in urea formaldehyde walls (e.g. polyoxymethyleneurea walls). The fine abrasive particles and microencapsules are distributed throughout the nonwoven web of fiber. The microencapsules are designed to be broken during normal use of the article so that perfume contained within the microencapsule may be released to the environment. The article is made for use in home, industrial and skin care applications.

US Patent Application No. 2005/0113277 to Sherry et al. discloses hard surface cleaning compositions, compositions with cleaning liquid composition on a substrate, compositions used with absorbent pads and implements and devices for making the process of cleaning hard surfaces and/or maintaining their appearance and hygiene easier and more effective. The composition includes multiple chemical components including, for example, hydrophilic polymer and optionally, surfactant, organic cleaning solvent, co-surfactant, and thickening polymer. The composition may be applied to a hard surface for soil prevention and prevention of soil build-up. The composition may also be added to a substrate to create a pre-moistened cleaning wipe.

One particularly useful absorbent particulate is urea formaldehyde polymer particles (also referred to herein as "U/F polymer particles"). Urea formaldehyde chemistry has also been used by the textile industry to crosslink fibers to produce durable press finish fabrics made of viscose, linen or cotton. The principle function of urea formaldehyde chemistry finish in these applications is to provide stiffness and elastic resilience to a treated fabric. The most common application method for such a durable press finish has been a pad coating of reactive urea formaldehyde intermediates followed by heat dry and heat cure procedures. However, there are several inherent problems associated with the use of urea formaldehyde as a durable press finish in this manner. These problems include greying during washing and loss of strength and yellowing of a treated textile substrate. Urea formaldehyde polymer particles, as described herein, are not formed by the procedure described above.

By taking advantage of the undesirable attributes of urea formaldehyde chemistry previously described, along with the unique accentuating attributes associated with urea formaldehyde in the form of a small particle with high surface area, these free flowing particles ideal for use as cleaning agents. However, when the particles are used to clean surfaces, such as a carpeted floorcovering article, an additional process step is required in order to remove the U/F polymer particle from the article. By binding these high surface area particles to a textile substrate, for example, a cleaning wipe may be produced that eliminates the need for any additional removal steps which provides a desirable advantage over the prior art use of urea formaldehyde as a cleaning agent. Cleaning wipes used in this manner retain the desirable absorbing characteristics of the free flowing particles and have effective surface area far greater than that possible by fiber or foam structures of the prior art.

More specifically, this invention permits the use of U/F polymer particles in such a way that takes advantage of what has previously been deemed problematic, while in the form of a non-particulate coating. The propensity of the urea formaldehyde chemistry to "grey" is beneficial in the case of cleaning and is accentuated further by increasing the surface area via particle formation. In the form of a cleaning wipe, this increased "greying" or coloration (contrasting with its substrate) may be used as a visual cue that stains are being removed from soiled surfaces and retained by the cleaning wipe or fixed particles. Thus, the visual cue provides evidence that soiled surfaces are being cleaned. The absorbing particulates also provide a surface with non-scratching abrasion for enhanced mechanical cleaning.

In summary, this invention takes advantage of the highly absorbent nature of certain particulate materials, such as U/F polymer particles, via the application of these particulate materials to a substrate, such as a textile substrate. One exemplary end-use product may be a cleaning wipe that easily and effectively cleans, with a non-scratching abrasive surface, a variety of soiled surfaces and provides a visual cue as evidence of its cleaning efficacy. The cleaning composition of the present invention may be applied to substrates using relatively simple and inexpensive application processes.

DETAILED DESCRIPTION

Figure 1:
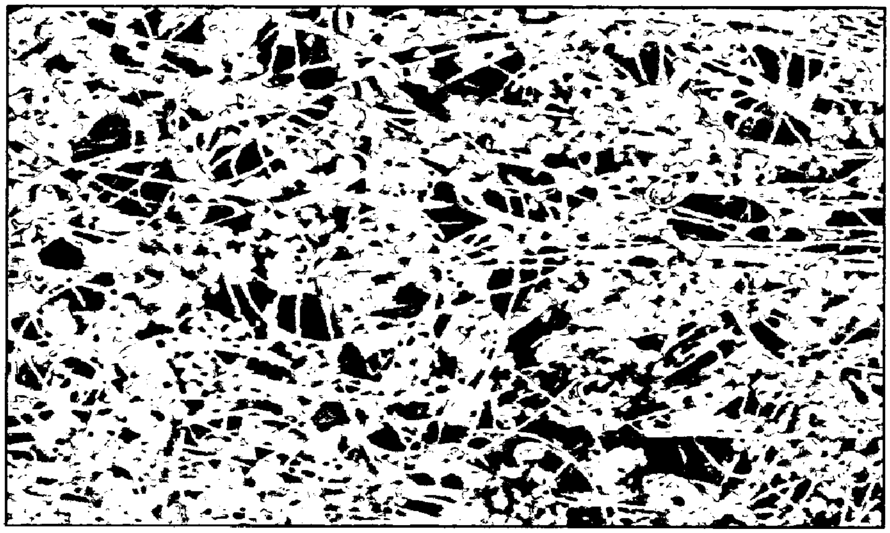
FIG. 1 is a scanning electron micrograph at 35 times magnification of a nonwoven polyester textile substrate treated with U/F polymer particles.

All patents, published patent applications, and any other publications mentioned in this patent application are herein incorporated by reference.

This invention generally relates to a cleaning device comprising at least one absorbent particulate, at least one binding agent, and a substrate. The substrate may be any flexible material having structural integrity that could be used for cleaning. The cleaning device may further include at least one viscosity modifier or thickening agent. This invention also relates to the process for making the cleaning device.

Cleaning Composition

The cleaning composition according to this invention generally includes at least one absorbent particulate, at least one binding agent, and optionally at least one viscosity modifier or thickening agent. As used herein, the term "cleaning" is intended to include, in addition to its ordinary meaning, the act of absorbing (such as absorbing odors, liquids, small particles, etc.) as well as the act of filtering.

The absorbent particulate generally fulfills the role of providing the cleaning function to the cleaning composition. The absorbent particulate is characterized by having a large surface area which provides a location for dirt and soil to adhere. In some instances, the absorption of dirt and soil onto the particulate results in a visual cue that a surface has been cleaned. Thus, the cleaning composition containing such absorbent particulates may exhibit an indicator function.

With regard to the absorbent property of the particulates, it is contemplated that the particulates may absorb ordinary dirt particles as well as other particles such as allergens, dust mites, viruses, pollen, radioactive material, chemical warfare material, irritants (e.g. smoke), and the like. End uses may include, without limitation, cleanroom cleaning wipes (e.g. for use in silicon wafer manufacturing facilities and automotive paint rooms), chalkboard cleaning wipes, polishing wipes (e.g. for silver, brass, etc.), vacuum cleaner bags, and the like.

With regard to the absorbent property of the particulates, it is contemplated that the particulates may absorb any variety of hydrophobic and/or hydrophilic fluids and oils including, without limitation, make-up, mechanic fluids and oils, human and animal body fluids, and the like. Thus, end uses may include brushes (e.g. hair brushes), bowling ball wipes, disinfecting wipes, wipes and materials used for spill management purposes, floor mats, mops, and the like.

With regard to the absorbent property of the particulates, it is contemplated that the particulates may absorb odors such as refrigerator odors, diaper odors, animal odors, shoe odors, and the like. Thus, end uses may include animal pet beds and blankets, refrigerator liners, wallpaper, residential and commercial upholstery fabric, automotive upholstery fabric, diapers, shoe inserts, packaging materials, and the like.

With regard to the gentle abrasive quality of the absorbent particulates of the cleaning composition, it is contemplated that the cleaning composition may be useful for many end uses such as make-up removal, hair removal (e.g. human hair remover, pet mitt), furniture cleaning and polishing, glass cleaning (e.g. windows, eye glasses), shoe polishing, bathroom and kitchen cleaning (both in a disinfectant capacity and in a polishing capacity, such as for hard surfaces and pots and pans and dishes), vehicle cleaning and polishing (and as a bug remover), recreational vehicle cleaning (e.g. boats, campers, RVs, etc.), sports equipment cleaning (e.g. cleaning/polishing golf clubs), vinyl cleaning (e.g. swimming pool liner), electronic device cleaning (e.g. computer screens) and the like.

The cleaning composition may be colored or not colored. It may be applied to a substrate in a patterned configuration. Coloration may be used as an indicator of cleaning efficacy. For example, when U/F polymer particle is the absorbent particulate, the particle may take on the color of the dirt and/or soil it has absorbed. Thus, the absorbent particulate provides the user a helpful visual indicator to see that an article has been cleaned. In this regard, the cleaning composition absorbs or traps dirt and soil. It is also possible that the cleaning composition may provide an indicator of pH change, temperature, light, wetness/dryness, and the like. In order for the cleaning composition to function in these capacities, it may be desirable to add other components to the cleaning composition, such as for example, starches or proteins which may indicate certain enzymatic activity. It may be desirable to include an affinity protein which may bind to targeted bacteria and/or viruses. The indicator component may also be attached to the absorbent particulate. End uses for any such indicator functions include, without limitation, indicators for radioactive material, biohazard material, and the like.

While the absorbent particulate comprising the cleaning composition is capable attracting, absorbing, trapping, etc. dirt and fluids and other soils, it is also believed that the particulates contained within the cleaning composition may also function as a reservoir for delivering materials for a particular end use. For instance, the absorbent particulate may be capable of delivering fragrance, solvents, pharmaceutical agents, antimicrobial agents, and the like.

The cleaning composition may also take advantage of the large surface area provided by the absorbent particulates and therefore be ideal for use as a filtering media for liquids or other particles.

The absorbent particulate material may include naturally occurring materials, such as wood particles (such as sawdust, cork, wood flour and the like), particles made from grains and other vegetable matter (such as coconut fiber), diatomaceous earth particles, cellulosic particles, natural sponge particles, inorganic particles (such as silicates, borates, etc.), and any mixtures thereof.

The absorbent particulate material may be a synthetic material, such as a synthetic resin material. Synthetic resin materials include, for example, urea formaldehyde polymer, such as those disclosed in commonly assigned U.S. Pat. Nos. 4,434,067 and 4,908,149. One example of a commercially available product, known by the tradename Capture® (available from Milliken & Company of Spartanburg, S.C.), is a cleaning powder that contains U/F polymer particles and calcium carbonate. Other synthetic resin materials include, for example, polyurethane, polystyrene, polyvinyl acetate, polyvinyl alcohol, polyvinyl chloride, polyethylene, polypropylene, polyacrylate, polyester, polycarbonate, polyamide, polysiloxane, phenol-formaldehyde resin particles (similar to the type disclosed in French Patent No. 2,015,972 assigned to Henkel Et Co Gmbh), polymelamine formaldehydes, polyacrylics, urea formaldehyde/melamine formaldehyde combinations, and any mixtures thereof. Other absorbent particles include water insoluble inorganic salt adjuvants such as, for example, sulfates, carbonates (such as calcium carbonate and sodium bicarbonate), borates, citrates, phosphates, silica, metasilicates, zeolites, and any mixtures thereof. Any mixture of the foregoing absorbent particulates may also be suitable.

However, it should be noted that highly colored absorptive particles, such as, for example, carbon black, red clay, and iron oxide, would be unacceptable for use as absorbent particulates as described herein. This is primarily due to the fact that these types of highly colored particles would most likely leave behind a residue of small particles after cleaning which would be undesirable; thus, a surface may appear soiled even after cleaning with a cleaning wipe treated with these types of highly colored absorbent particulates.

The absorbent particulate may be produced by size-reduction of larger pieces of material. This may be achieved, for example, by grinding or otherwise cutting up the large pieces into smaller particles. Alternatively, very fine particles may be combined together to form a larger agglomeration of a certain material. This may be accomplished by agglomeration techniques known to those skilled in the art.

The absorbent particulate may be characterized by having a certain hardness value. As one example, absorbent particulates may be characterized according to Mohs' Hardness Scale. Using this Scale, a material's resistance to scratching by another material may be determined. Mohs' Hardness Scale provides values ranging from 1 to 10 in half steps increments (i.e. 0.5, 1.0. 1.5, etc.). Materials having a higher Mohs' Hardness value are known to scratch those materials having a lower Mohs' Hardness value. Diamond, as one example, has a Mohs' Hardness value of 10. Calcium carbonate has a Mohs' Hardness value of 3. Thus, it can be determined that diamond will scratch a material made from calcium carbonate.

It may desirable that the absorbent particulate of the current invention has a Mohs' hardness value that is equal to or less than about 3. However, it may also be desirable to include other particulate materials having a higher Mohs' value into the cleaning composition of the current invention. For example, in order to increase the polishing effect of the cleaning composition, sand grit may be included in the cleaning composition as the polishing component and U/F polymer particles may be included as the absorbent particulate.

In one embodiment of the invention, cleaning compositions which contain U/F polymer particles as the absorbent particulate may be preferred. When applied to textile substrates, for example, textile substrates which contain these particles are effective at cleaning a variety of stains, and the incorporation of these particles into or onto textile substrates allows the treated textile substrates to be used on a variety of surfaces without leaving a powder or film residue. Furthermore, textile substrates treated with U/F polymer particles provide a medium that, with gentle abrasion, easily lift, remove, and absorb stains without scratching soiled surfaces. The ability of U/F polymer particles to absorb stains allows it be used as a visual cue, since it is readily apparent to the consumer that soiled surfaces are being cleaned because stains can be seen as discoloration on the treated textile substrate. Additionally, textile substrates treated with U/F polymer particles may be used either wet or dry and without the need for a surfactant for surfactant-free applications.

Suitable types of U/F polymer particles are described, for example, in commonly assigned U.S. Pat. No. 4,434,067 to Malone et al. and U.S. Pat. No. 4,908,149 to Moore et al. U/F polymer particles typically exhibit and possess very large surface area. Average particle size of the polymer may be from about 1 micron to about 300 microns in diameter as determined by sieve analysis. It may be more preferable that the average particle size of the U/F polymer particles is from about 1 micron to about 200 microns in diameter, as determined by sieve analysis. It may be even more preferable that the average particle size of the U/F polymer particles is from about 1 micron to about 105 microns in diameter, as determined by sieve analysis. It may yet be even more preferable that the average particle size of the U/F polymer particles is from about 35 microns to about 105 microns, as determined by sieve analysis. In general, it may be preferable for some applications that the particle size distribution should be such that not more than about 10 percent of the particles are larger than about 105 microns and in general no more than about 5 percent of the particles are smaller than about 10 microns.

The U/F polymer particles may be further characterized by the classical Critical Pigment Volume (CPV) effect, also known as the oil value or oil absorption value. This value may be determined by ASTM D281 and is described, for example, in U.S. Pat. No. 3,956,162 to Lautenberger. To remain a flowable powder, the maximum liquid content is restricted to below the oil absorption value. For particles of a certain shape, the oil absorption value is the volume between particles filled with air. As the air is displaced by a fluid, the flow properties of the powder are reduced until, at the oil absorption value, all the particles are surrounded by liquid. For particles of a certain shape, the CPV is the volume between particles filled with air. As the air is displaced by a fluid, the flow properties of the powder are reduced until, at the CPV, all the particles are surrounded by liquid. At that point, the mass has the consistency of putty. If more fluid is added, the putty gradually thins until a paint-like dispersion is generated. Accordingly, it may be preferred that the U/F polymer particles have an oil absorption value of at least 40. It may be more preferable that the U/F polymer particles have an oil absorption value of at least 60.

A binding agent may also be useful in the cleaning composition to assist in preventing the absorbent particulate from flaking off from the substrate. Thus, the binding agent may be any material which aids in adhering the absorbent particulate to a substrate. The binding agent to absorbent particulate ratio may be in the range of about 0:1 to about 6:1 by weight. The weight is by weight in the print paste formulation which is then applied to the fabric. The binding agent may be selected from the group consisting of polyurethane-containing compounds, acrylic-containing compounds, polyester-containing compounds, polyethylene-containing compounds, plastisol-containing compounds, and any mixtures thereof. One commercially available example of a binding agent is a polyurethane-based binding agent known by the tradename, Witcobond® W-293 available from Chemtura Corporation of Middlebury, Conn. Another example is an acrylic-based binding agent known by the tradename, Printrite® 595 available from Noveon. Plastisol compounds are described, for example, in U.S. Pat. No. 6,756,450 to Marinow.

If it is desirable that the absorbent particulate is incorporated into a substrate (as opposed to on the surface of a substrate), it is contemplated that the substrate itself may fulfill the function of the binding agent. For example, absorbent particulate may be added to a thermoplastic material during the manufacture of the thermoplastic material. Or absorbent particulate may be added to a paper substrate during the manufacture of the paper substrate. In these instances, the thermoplastic material and/or paper substrate provide the necessary structure to hold the absorbent particulate in place. No additional binding agents may be needed for these applications.

A thickening agent, or viscosity modifier, may also be included in the cleaning composition for suspension and viscosity modification purposes. It may be ideal that a thickening agent is added to a composition containing absorbent particulate in order to adjust the viscosity of the composition. It may be ideal that the viscosity is between about 100 cps and about 10,000 cps. It may further be preferred that the viscosity is between about 1000 cps and about 8000 cps. It may be even further preferred that the viscosity is between about 1000 cps and about 5000 cps. The ultimate viscosity level will depend upon the application method used for applying the U/F polymer particles to the textile substrate. For instance, viscosity levels between 1000 cps and 5000 cps may be ideal for printing and pad coating application techniques because it tends to provide sufficient suspension of the U/F polymer particles in the print paste or pad mixture. It is preferable that the thickening agent does not react with any of the other components of the cleaning composition. The thickening agent may be selected from the group consisting of starches, gums, guars, clays, alginates, synthetic thickening agents (such as polyacrylate), and mixtures thereof. Commercially available examples of thickening agents include Solvitose® C-5, a starch available from Avebe Group of The Netherlands; Acrysol® 8306, a polyacrylate available from Rohm and Haas; and Serviprint® 9410, a synthetic thickener available from Noveon.

The compatibility of the cleaning composition with other chemical components provides multiple methods for applying the composition to a substrate. For instance, the cleaning composition may be added to the substrate during the substrate manufacturing process. Alternatively, the cleaning composition may be added to the substrate after the manufacturing process.

The substrate may contain printed designs, patterns, and/or logos on the surface of the substrate using various methods and compositions to achieve such designs. In one embodiment, printing ink may used to produce designs, patterns, and/or logos on the surface of a substrate. The printing ink may or may not include the cleaning composition of the present invention in order to produce the designs and logos. Alternatively, a substrate may be patterned using heat, such as by the process of embossing, in order to achieve a pattern on the surface of the substrate. In another embodiment, a substrate may be first treated with the cleaning composition of the present invention such that the composition is uniformly distributed across both surfaces of the substrate. The treated substrate may then be printed with a colored logo using printing ink, as one non-limiting example.

In yet another embodiment, the substrate may not contain any cleaning composition at all until the printing process is initiated. At this time, the printing medium (such as a printing ink) may contain colored ink and the cleaning composition. This procedure allows for the cleaning composition to be applied to a substrate in a distinct pattern that may result in a non-uniform distribution of cleaning composition to one or both sides of a substrate. Still yet another embodiment of this invention is to print a design or logo on a substrate using the cleaning composition as a printing medium. Thus, when the printed substrate is used for cleaning, the design or logo is revealed as stains and dirt are absorbed by the cleaning composition contained thereon.

Other components which enhance the cleaning efficacy of the substrates treated with the cleaning composition of the present invention may be added to the cleaning composition as well. For example, compounds which aid in the manufacture of the cleaning composition or process for treating substrates with the cleaning composition may be added. These may include, without limitation, organic solvents, surfactants, optical brighteners, re-soiling inhibitors, antimicrobial agents, bleaching agents, anti-dusting agents, anti-static agents, preservatives, perfumes, and the like.

Substrate

Because of these unique properties of the cleaning composition, it is contemplated that the composition may be applied to or incorporated into any variety of substrates where cleaning is needed. For example, the cleaning composition may be applied to textile substrates, films, foam materials, paper substrates, alginates, compounds containing one or more gelling agents, and the like. Foam materials may include, without limitation, blown polyurethane which is often used to form sponges. As merely examples, it is contemplated that the cleaning composition may be suitable for use in applications such as wallpaper, filters, garments, toothpaste, exfoliating cream/gel, hand cleaner solution, trash bags, and the like.

The substrate may be of any shape or size as needed for a particular end-use application. The substrate may be formed into a composite material by combining multiple layers a particular substrate, or multiple layers of several different substrates, together into a final composite structure.

As mentioned previously, the cleaning composition may be applied to or incorporated into a textile substrate or to paper. In this embodiment, a treated textile substrate or a treated paper may be ideal for use as a cleaning wipe. The cleaning wipe may be used in either a wet or dry state, and it may be used to clean a variety of surfaces, including hard surfaces (such as ceramic tile and linoleum flooring) and textile surfaces (such as carpeting, upholstery, and apparel). The cleaning wipe may be manufactured inexpensively, especially for applications wherein the cleaning wipe is intended to be disposable. However, the cleaning wipe may also be designed to withstand repeated use and laundering cycles.

Suitable textile substrates for receiving the cleaning composition include, without limitation, fibers, yarns, and fabrics. Fabrics may be formed from fibers such as synthetic fibers, natural fibers, or combinations thereof. Synthetic fibers include, for example, polyester, acrylic, polyamide, polyolefin, polyaramid, polyurethane, regenerated cellulose (e.g., rayon), and blends thereof. The term "polyester" is intended to describe a long-chain polymer having recurring ester groups (—C(O)—O—). Examples of polyesters include aromatic polyesters, such as polyethylene terephthalate (PET), polytriphenylene terephthalate, polytrimethylene terephthalate (PTT), and polybutylene terephthalate (PBT), and aliphatic polyesters, such as polylactic acid. Polyamide includes, for example, nylon 6; nylon 6,6; nylon 1,1; and nylon 6,10; and combinations thereof. Polyolefin includes, for example, polypropylene, polyethylene, and combinations thereof. Polyaramid includes, for example, poly-p-phenyleneteraphthalamid (i.e., Kevlar®), poly-m-phenyleneteraphthalamid (i.e., Nomex®), and combinations thereof. Natural fibers include, for example, wool, silk, cotton, flax, and blends thereof.

The fabric may be formed from fibers or yarns of any size, including microdenier fibers and yarns (fibers or yarns having less than one denier per filament). The fibers or yarns may have deniers that range from less than about 1 denier per filament to about 2000 denier per filament or more preferably, from less than about 1 denier per filament to about 500 denier per filament, or even more preferably, from less than about 1 denier per filament to about 300 denier per filament.

Furthermore, the fabric may be partially or wholly comprised of multi-component or bi-component fibers or yarns which may be splittable along their length by chemical or mechanical action. The fabric may be comprised of fibers such as staple fiber, filament fiber, spun fiber, or combinations thereof.

The fabric may be of any variety, including but not limited to, woven fabric, knitted fabric, nonwoven fabric, or combinations thereof. The fabric may optionally be colored by a variety of dyeing techniques, such as high temperature jet dyeing with disperse dyes, thermosol dyeing, pad dyeing, transfer printing, screen printing, or any other technique that is common in the art for comparable, equivalent, traditional textile products. The textile substrate may be dyed or colored with any type of colorant, such as, for example, pigments, dyes, tints, and the like. Other additives may be present on and/or within the textile substrate, including antistatic agents, brightening compounds, nucleating agents, antioxidants, UV stabilizers, fillers, permanent press finishes, softeners, lubricants, curing accelerators, and the like.

Paper substrates include, without limitation, paper substrates comprised of cellulosic paper fiber. Paper substrates may also be comprised of a mixture of paper fibers (e.g. cellulosic fiber) and synthetic fiber (e.g. such as those listed previously herein).

Application of Cleaning Composition to Substrate

The cleaning composition may generally be applied to a substrate via any application method which allows for the deposition of a controlled amount of a liquid composition onto the surface of the substrate. The application method may include adding the cleaning composition during manufacture of the substrate, such as before final formation of the substrate. This method allows for the cleaning composition to be incorporated into the substrate. Alternatively, the application method may include adding the cleaning composition to a substrate immediately after the substrate manufacturing process, such as via an in-line application process. Yet another method includes adding the cleaning composition to a substrate in a process step separate from the substrate manufacturing process. Non-limiting examples of this application method include screen printing, pad coating, foam coating, spray coating, or reacting the composition onto the surface of the substrate.

In one embodiment, screen printing may be used to apply the cleaning composition to a substrate. This technique allows for the cleaning composition to be applied to at least a portion of one surface of the substrate or to at least a portion of both surfaces of the substrate. In one embodiment, the substrate may be a textile substrate that is printed with the cleaning composition. A porous, mesh screen is typically placed on top of the textile substrate. Suitable mesh size of the mesh screen may depend on the particle size of the components comprising the cleaning composition and/or the viscosity of the cleaning composition. As merely examples, the mesh size may be between about 40 and about 125. If it is desirable that a specific pattern be produced on the textile substrate, a stencil may be utilized as well. The print paste may be applied using techniques known to those skilled in the art of screen printing. After the textile substrate has been printed, it may be cured. Curing may be accomplished, for example, by placing the treated substrate in an infrared furnace or oven.

In another embodiment, the cleaning composition may be pad coated onto a substrate. In one embodiment, a textile substrate is passed through a tray which contains the cleaning composition. This technique allows for the cleaning composition to be applied to only one surface of the textile substrate or to both surfaces of the textile substrate. After pad coating, the treated textile substrate is then fed through pressurized squeeze rolls in order to remove excess cleaning composition. Wet pick up of the cleaning composition on the textile substrate is preferably between about 45 and about 220 weight percent. The treated textile substrate is then heat cured. Heat curing may be accomplished, for example, by placing the substrate in a heating device, such as a furnace or oven.

In yet another embodiment, the cleaning composition may be foam coated onto a substrate. This technique allows for cleaning composition to be applied to at least a portion of one surface of the substrate or to at least a portion of both surfaces of the substrate. Using this technique, the foaming apparatus may be set to a desired speed and liquid flow in order to achieve about a desirable weight percent wet pick up of the cleaning composition on a substrate such as, for example, a textile substrate. The treated substrate, such as a treated textile substrate, is then placed in a heating device, such as, for example, a vertical oven, to cure. Exemplary foaming conditions include foamer settings at 10 ypm with a liquid flow of 0.048 L/min and curing at 310 degrees F. for 60 seconds.

Another application technique involves in situ generated polymerization on or in a substrate. This process results in a cleaning composition which is actually reacted onto the surface of the substrate or which is actually reacted in the substrate. By using this method, the need for an additional binding agent may be eliminated.

A further application technique involves using heat to activate an adhesive material to attach the cleaning composition to the surface of the substrate. For example, a hot melt adhesive is one example of a suitable adhesive material. A hot melt adhesive may be used in place of an aqueous-based binding agent. One example of a commercially available hot melt adhesive is Bostik PE120, a high performance polyester-based polymer, available from Bostik Findley, Inc. The hot melt adhesive may be in the form of a scrim that is added to the substrate, which is then exposed to heat. Alternatively, the hot melt adhesive may be added to the substrate via a process known as scatter coating. Typically, a scatter roller sprinkles loose, course powder onto the surface of a substrate, and the powder is melt adhered to the substrate via heat. In one embodiment that utilizes the scatter coating technique, a hot melt adhesive is mixed with an absorbent particulate and applied to a substrate, and the treated substrate is exposed to heat.

In yet another embodiment, the cleaning composition may be incorporated into a substrate during the substrate manufacturing process. For example, during the process of forming paper, the cleaning composition may be added to the paper pulp such that when the paper is produced in its final form, it already contained the cleaning composition. Additionally, the cleaning composition may be added to a thermoplastic polymer melt such that when the final thermoplastic material is formed, the cleaning composition is already incorporated therein.

Method of Use of Treated Substrate

The treated substrate, e.g. a textile or paper cleaning wipe, may used either dry or wet. For dry use, the treated substrate is simply brought into contact with a soiled surface and, using a rubbing or wiping motion, the surface may be cleaned.

For wet use, the treated substrate may be placed in, or sprayed with, a wetting agent. The wetting agent may be any liquid that is capable of wetting the treated substrate. Examples include polar liquids, non-polar liquids, and any mixtures thereof. These include organic solvents, surfactants, and any mixtures thereof. Organic solvents include both water-miscible and water-immiscible solvents. Suitable solvents include, for example, alcohols, ketones, glycol ethers, chlorinated solvents, and hydrocarbons. Specific examples of solvents include isopropanol, acetone, ethers of monoethylene and diethylene glycol, ethers of mono-, di-, and tripropylene glycol, gasolines, and more particularly, low aromatic fractions, and mixtures of these solvents. Solvents including $C_{2-3}$ alcohols, propylene glycol ethers, gasolines, and mixtures thereof may be preferred.

Other specific non-limiting examples of wetting agents include water, solutions containing quaternary amines, solutions containing blocked copolymers (such as ethylene and propylene oxide), biocide solutions, and any mixtures thereof. One example of a commercially available wetting agent is known by the tradename, Capture® Pre-Mist (available from Milliken & Company of Spartanburg, S.C.). Capture® Pre-Mist contains water, a difunctional block copolymer terminating in hydroxyl groups, and biocide.

The wetting agent may be present up to about 90% by weight of the treated substrate. However, it may be preferred that the organic solvents are present in an amount between about 2% and about 20% by weight. It may be more preferable that the organic solvents are present in an amount between about 2% and about 15%.

After removing the treated substrate from the wetting agent (if it has been placed in a wetting agent solution), it is brought into contact with a soiled surface. Using a rubbing or wiping motion, the surface may be cleaned. In either case, the treated substrate will become dirty, due to the cleaning composition absorbing and removing dirt and stains from a particular surface. The treated substrate may be designed for washing and re-use, or it may be designed for disposable use. Alternatively, the treated substrate may be sprayed with a wetting agent and used in the manner described herein.

While the treated substrate may be used alone, it may also be combined with an implement which includes a handle and an attachment device for the treated substrate. The handle may be of any variety which allows the consumer to better use the treated substrate and which provides ergonomically helpful assistance for cleaning hard to access areas. The attachment device may be comprised of any materials which allow for the adequate attachment of the treated substrate to the implement. Non-limiting examples of implements include wet and dry floor mops, hand-held shower and/or tub cleaning apparatus, and toilet bowl cleaning apparatus.

EXAMPLES

The following examples further illustrate a substrate treated with the cleaning composition of the current invention, but they are not to be construed as limiting the invention as defined in the claims appended hereto. In fact, it will be apparent to those skilled in the art that various modifications and variations can be made in this invention without departing from the scope or spirit of the invention. All parts and percents given in these examples are by weight unless otherwise indicated.

Comparative Examples

Several Comparative Examples were also evaluated according to one or more of the test procedures described herein. They include:

Comparative Example 1 a Scott® brand paper towel

Comparative Example 2

Clorox® disinfecting wipes (available from The Clorox Company)

Comparative Example 3

Scotch-Brite® Scrubby Wipes (available from 3M)

Comparative Example 4

Scrubbing Bubbles® Flushable Wipes (available from SC Johnson & Sons, Inc.)

Comparative Example 5

Pledge® Multi Surface Cleaner (available from SC Johnson & Sons, Inc.)

Comparative Example 6

Armor All® Cleaning Wipes (available from The Clorox Company)

Comparative Example 7

Easi-Step® Wipe Off Stain Remover (available from Easi-Step Global Marketing)

Comparative Example 8

Mr. Clean Magic Eraser® (available from Procter & Gamble)

Comparative Example 9

Mopar® Multi-Purpose Cleaner (available from Daimler Chrysler Motor Company LLC)

Comparative Example 10

Mopar® Total Clean (available from Daimler Chrysler Motor Company LLC)

Comparative Example 11

Shout® Color Catcher™ (available from SC Johnson & Sons)

Control Examples

Several control samples were used for throughout the Examples section for various test procedures. They include:

Control 1: A stained surface which was not cleaned.

Control 2: A stained surface which was cleaned with an untreated Celfil polyester textile substrate and surfactant.

Test Procedures:

The following test procedures were used to test the cleaning efficacy of inventive and comparative cleaning wipes. The cleaning wipes were tested on several surfaces including linoleum; laminate flooring, carpeting, and automotive upholstery fabric. The stains tested include graphite, synthetic dirt, red clay, Sharpie® permanent markers, Crayola® crayons, Heinz® ketchup, Cover Girl® concealer make-up, and red wine.

A. Hard Surface Cleaning Procedure 1 and 2

Hard Surface Cleaning Procedure 1

The following test procedure is based on ASTM Method D 4488-95 "Standard Guide for Test Cleaning Performance of Products Intended for Use on Resilient Flooring and Washable Walls." The test was performed on linoleum, wallpaper, countertops, and dry wall.

The steps for testing are as follows:

1. Cut the hard surface sample into 3 inch by 6 inch samples.
2. Wash each sample using a commercial hand dishwashing liquid diluted with water to a ratio of 1:125 (1 oz/gal).
3. Using a large cellulose sponge, scrub the surface of each sample with 25 strokes and then rinse well with warm water.
4. Hang the washed samples to dry at room temperature for 16-18 hours.
5. Graphite and red clay are used to simulate particulate soil. Apply an excess of these powders onto the surface of each sample.
6. Crayola® crayons (blue, orange, green and red) are used to apply a waxy soil. Using the crayon, make multiple passes over the surface of each sample.
7. Sharpie® permanent markers (blue, yellow, green and red) are also used to evaluate cleaning efficacy. Using the permanent marker, make several passes over the surface of each sample.
8. Once the test samples are prepared with stains allow them to sit for 24 hours before cleaning.
9. To clean, use a cleaning wipe and wipe the stained surface of each sample (in the opposite direction of soiling) a set number of times using approximately the same amount of pressure for each sample.
10. Rate the samples on a scale of 1 to 5 (1=no cleaning; 5=completely clean). In most cases, since no attempt was made to clean the control sample ("Control 1"), the control sample was designated as "0."
11. In some instances, as indicated, the cleaning and rating procedure (steps 9 and 10) may be repeated using a second cleaning wipe.

Hard Surface Cleaning Procedure 2

The surface color of an article may alternatively be quantified using a series of measurements (L*, a*, and b*) generated by measuring the samples using a spectrophotometer. The equipment used for this test was a Gretag Macbeth Color Eye 7000A spectrophotometer. The software program used was "Color imatch." "L" is a measure of the amount of white or black in a sample; higher "L" values indicate a lighter colored sample. "A" is a measure of the amount of red or green in a sample, while "B" is a measure of the amount of blue or yellow in a sample.

Other measures made using the same testing equipment include C* and h°. C*, chroma, is a measure of the color saturation of the article. h°, hue, is a measure of the shade of the article. WI-GANZ is a whiteness index.

Yet another measurement of the relative color of the samples is DE CMC. DE CMC is a measure of the overall color difference for all uniform color spaces, where DE CMC represents the magnitude of difference between a color and a reference (in this case, a pure white standard). The higher the DE CMC value, the more pronounced the difference in color. Said another way, smaller DE CMC values represent colors that are closer to white. The Gretag Macbeth Color Eye 7000A Spectrophotometer calculates DE CMC values based on wavelength and reflectance data for each sample.

Color measurements were made on a stained linoleum surface as described below. Using these measurements, a "Percent Soil Removal" from the linoleum surface was calculated.

The steps for testing are as follows:

1. Cut the linoleum into 3 inch by 6 inch samples.
2. Wash the each sample using a commercial hand dishwashing liquid diluted with water to a ratio of 1:125 (1 oz/gal).
3. Using a large cellulose sponge, scrub the surface of each sample with 25 strokes and then rinse well with warm water.
4. Hang the washed samples to dry at room temperature for 16-18 hours.
5. Using a Gretag Macbeth Color Eye 7000A, take 5 readings in various spots on the surface of the linoleum in reflectance mode using UV light at a 10° observer. Average these five readings. This is the average for the linoleum samples before staining (S).
6. Use a blue Sharpie® permanent marker to color the entire surface of the linoleum. Allow the stained linoleum to sit for 24 hours.
7. Using a Gretag Macbeth Color Eye 7000A, take 5 readings in various spots on the stained surface of the linoleum in reflectance mode using UV light at a 10° observer. Average these five readings. This is the average for the linoleum before cleaning (BC).
8. To clean, take one cleaning wipe (treated according to this invention) and fold it in half two times. Wipe the stained surface of the linoleum, using moderate pressure, with the cleaning wipe until the cleaning wipe is completely discolored with the stain (using visual cue). Allow the linoleum to dry.
9. Using the Gretag Macbeth Color Eye 7000A, take 5 readings in various spots on the cleaned surface of the linoleum in reflectance mode using UV light at a 10° observer. Average these five readings. This is the average for the linoleum after the initial cleaning (AC1).
10. Using the L* values obtained from the Gretag Macbeth Color Eye 7000A, subtract AC1 from BC. This value is called (D). Divide (D) by the sum of (BC) and (AC1) and then multiple by 100. This is the % soil removed (% SR) from the initial cleaning.
11. To clean again, take a second cleaning wipe (treated according to this invention) and fold it in half two times. Wipe the initially cleaned surface of the linoleum, using moderate pressure, with the cleaning wipe until the cleaning wipe is completely discolored with the stain (using visual cue). Allow the linoleum to dry.
12. Using the Gretag Macbeth Color Eye 7000A, take 5 readings in various spots on the surface of the cleaned linoleum in reflectance mode using UV light at a 10° observer. Average these five readings. This is the average for the linoleum after the final cleaning (FC1).
13. Using the L* values obtained from the Gretag Macbeth Color Eye 7000A, subtract FC1 from BC. This value is called (E). Divide (E) by the sum of (BC) and (FC1) and then multiple by 100. This is the % soil removed (% SR) from the final cleaning.

B. Textile Substrate Cleaning Procedure: Carpeting and Automotive Upholstery Fabric The following test procedure has been adapted from AATCC Test Method 175-1992 "Stain Resistance: Pile Floor Coverings." The test was performed on carpeting and automotive upholstery fabric.

1. Brush or vacuum the carpet/upholstery sample to remove any loose surface materials.
2. Place the carpet/upholstery sample on a flat, non-absorbent surface.
3. Place the staining template on the carpet/upholstery test sample.
4. The following staining materials may be applied to the test sample: synthetic carpet soil (AATCC Test Method 122) from Textile Innovators, red clay, red wine, Heinz® ketchup, mustard, burned motor oil (BMO), Sharpie® permanent marker, and Cover Girl® concealer (classic beige color). The synthetic dirt is made up with a 1:2 dirt to water ratio; the red clay is made up with a 1.5:1 red clay to water ratio; and, the red wine stain comprises 10 mL of wine.
5. Brush or pour a staining material into the center of the template.
6. After the staining material is applied to the carpet/upholstery test sample, use two Kimwipes® to press the staining material into the pile.
7. Remove the template from the carpet/upholstery test sample.
8. Allow the carpet/upholstery test sample to sit for 24 hours.
9. Using approximately uniform pressure, clean the staining material from each carpet/upholstery test sample.
10. The rating scale for this test was modified to better correlate with previously described test procedures. Rate the cleaned carpet/upholstery test sample on a scale from 1 to 5 (1=no cleaning, 5=completely clean). In most cases, no attempt was made to clean the control sample ("Control 1"); the control sample was designated "0."

Test Results

Test 1: Evaluation of Inventive Cleaning Wipes Versus Control Wipes

Several variations of the inventive cleaning wipe were prepared as described previously. These cleaning wipes were tested against several different control wipes using ASTM Method D 4488-95 for hard surfaces and AATCC Test Method 175-1992 for pile surfaces, with the following modification: in some instances, 25 strokes were used to clean the stained substrate; in other instances, the substrate was cleaned as much as possible (i.e. more than 25 strokes). The wipes were tested on Armstrong® Landmark collection, Rosedale Delft/White, Product #24876 linoleum and medium grade white to off-white nylon 6,6 cut pile carpet surfaces.

The samples tested include the following:

Example 1

Figure 2:
FIG. 2 is a scanning electron micrograph at 300 times magnification of the U/F polymer containing textile substrate shown in FIG. 1.

A 100% nonwoven textile substrate known by the product name "Celfil" (available from Polimeros, a Mexican company) having a weight of 40 g/$m^2$ was screenprinted on one surface with 35.5% Capture® deep cleaning powder, 8.43% Witcobond 293, 28.6% water, and 27.4% C5 starch (from an 8% solution of C5 starch and water). This provided an approximate ratio of % Capture® to % binding agent to % water of about 50:10:40. Screenprinting was accomplished using a 40 mesh size screen. Viscosity of print paste was 4400 cps. The strike-off table had a pressure setting of 6 and a speed setting of 40. For illustrative purposes, FIGS. 1 and 2 provide scanning electron micrographs of this formulation after being screenprinted onto the Celfil substrate.

Comparative Control 1

The Celfil polyester substrate was screenprinted with a formulation comprising 28.4% Witcobond 293, 28.2% water, and 43.4% C5 starch (from a 10% solution of C5 starch and water). Screenprinting was accomplished using a 40 mesh size screen. Viscosity of print paste was about 4300 cps.

Example 2

Same as Example 1, but screenprinting was accomplished using a 125 mesh size screen.

Comparative Control 2

The Celfil polyester substrate was screenprinted with a formulation comprising 28.4% Witcobond 293, 28.2% water, and 43.4% C5 starch (from an 10% solution of C5 starch and water). Screenprinting was accomplished using a 125 mesh size screen. Viscosity of print paste was about 4300 cps. Capture® Pre-Mist (75 weight percent solution) was used to moisten all of the samples, except for Control 1. The test results are shown in Table 1.

TABLE 1

Test Results For Inventive Cleaning Wipes Versus Control Wipes

| Sample ID | Linoleum Permanent Markers 25 Strokes/ Total cleaning | Linoleum Crayons 25 Strokes/Total Cleaning | Carpet Crayons Total Cleaning |
|---|---|---|---|
| Control 1 | 0/0 | 0/0 | 0 |
| Control 2 | 1/2 | 1/2 | 1.5 |
| Example 1 | 1/4.5 | 3.5/5 | 2.5 |
| Comparative Control 1 | 1/4 | 2.5/4 | 2 |
| Example 2 | 1/4 | 3.5/4.5 | 2 |
| Comparative Control 2 | 1/3 | 2/3.5 | 1.5 |

Test 2: Hard Surface Cleaning of Stains and Particulate Material on Linoleum

Linoleum was tested for cleaning efficiency according to the ASTM Method D 4488-95 described previously. The linoleum was stained with several different particulates and staining materials and tested for cleaning efficiency using cleaning wipes of the current invention and several commercially available cleaning wipes/sponges. The linoleum was Armstrong® Landmark collection, Rosedale Delft/White, Product #24876.

Example 3

The Celfil polyester substrate was screenprinted with a formulation comprising 28.1% Capture® powder, 14.1% Witcobond 293, 14.1% water, and 44.0% C5 starch (from an 8% solution of C5 starch and water). This provided an approximate ratio of % Capture® to % binding agent to % water of about 50:25:25. Screenprinting was accomplished using a 40 mesh size screen. Viscosity of print paste was about 2500 cps.

Example 4

The Celfil polyester substrate was screenprinted with a formulation comprising 24.9% U/F polymer particles (based on solids), 20.1% Witcobond® W-293, 20.6% water, and 19.0% C5 starch (from an 8% solution of C5 starch and water). This provided an approximate ratio of % U/F polymer particles to % binding agent to % water of about 38:31:31. Screenprinting was accomplished using a 40 mesh size screen. Viscosity of print paste was about 5000 cps.

Example 5

The Celfil polyester substrate was screenprinted with a formulation comprising 35.5% Capture® powder, 8.4% Witcobond® W-293, 28.6% water, and 27.4% C5 starch (from an 8% solution of C5 starch and water). This provided an approximate ratio of % Capture® to % binding agent to % water of about 50:10:40. Screenprinting was accomplished using a 40 mesh size screen. Viscosity of print paste was about 4700 cps.

Example 6

The Celfil polyester substrate was screenprinted with a formulation comprising 38.9% Capture® powder, 19.4% Witcobond® W-293, 23.3% water, and 18.3% C5 starch (from an 8% solution of C5 starch and water). This provided an approximate ratio of % Capture® to % binding agent to % water of about 50:25:25. Screenprinting was accomplished using a 40 mesh size screen. Viscosity of print paste was about 3200 cps.

Example 7

The Celfil polyester substrate was screenprinted with a formulation comprising 40.2% Capture® powder, 20.1% Witcobond® W-293, 20.5% water, and 19.2% C5 starch (from an 8% solution of C5 starch and water). This provided an approximate ratio of % Capture to % binding agent to % water of about 50:25:25. The Capture® powder in this instance was not purchased commercially, but was instead manufactured in the laboratory as Capture lot #13214-30. This Capture® power formulation differed from the commercially available product in that a different surfactant was used. The surfactant used was Tomadyne 103 LF from Tomah Products, Inc. Screenprinting was accomplished using a 40 mesh size screen. Viscosity of print paste was about 3400 cps.

Example 8

The Celfil polyester substrate was screenprinted with a formulation comprising 40.0% Capture® powder, 20.3% Witcobond® W-293, 20.5% Capture® Pre-Mist, and 19.2% C5 starch (from an 8% solution of C5 starch and water). This provided an approximate ratio of % Capture® to % binding agent to % Capture® Pre-Mist of about 50:25:25. Screenprinting was accomplished using a 40 mesh size screen. Viscosity of print paste was about 3900 cps.

Test results are shown in Table 2A. Control 2 was wet with water prior to use. Example 3 was wet with Capture® Pre-Mist ("Pre-Mist) prior to use in one instance and with a solution of 20% isopropyl alcohol ("IPA") prior to use in another instance. Each of the Comparative Examples was used as directed. Blue, yellow, green and red permanent markers were tested. Red, green, orange and blue crayons were tested.

Figure 3:
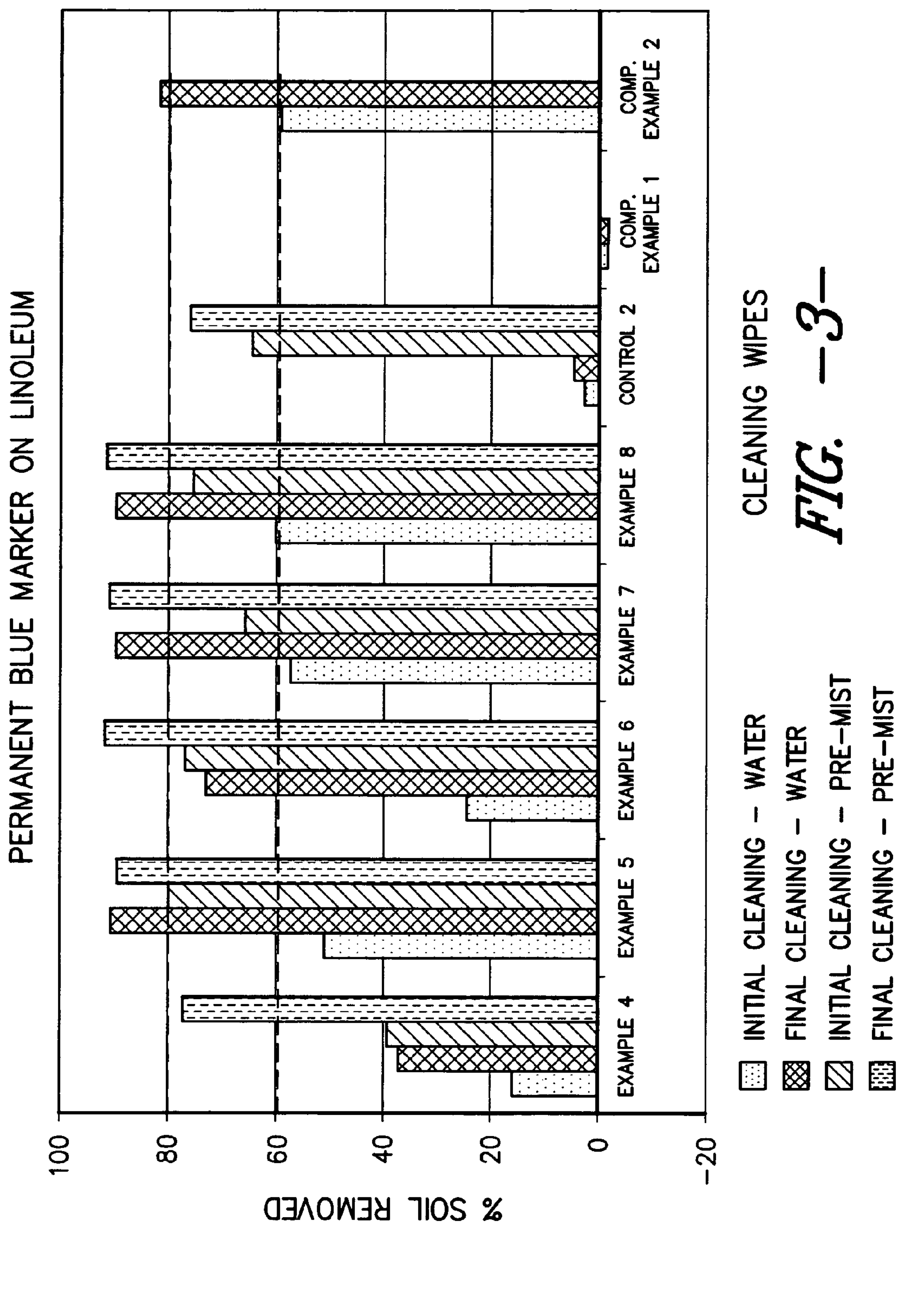
FIG. 3 is a bar graph illustrating the percent soil (blue permanent marker) removed from a linoleum surface using various cleaning wipes.

Test results are shown in Table 2B and FIG. 3 for substrates tested according to the alternative test procedure for determining cleaning efficiency which includes the use of the Gretag Macbeth Color Eye 7000A. The staining material was blue permanent marker. Most samples were pre-wet with two different solutions—water and Capture® Pre-Mist. However, no solution was used to wet Comparative Examples 2 through 5; rather, they were used as provided.

TABLE 2A

Hard Surface (Linoleum) Cleaning Results

| Sample ID | Permanent Markers First Cleaning/ Second Cleaning | Crayons First Cleaning/ Second Cleaning | Graphite First Cleaning/ Second Cleaning | Red Clay First Cleaning/ Second Cleaning |
|---|---|---|---|---|
| Control 1 | 0/0 | 0/0 | 0/0 | 0/0 |
| Control 2 | 0/0 | 0.5/3 | 0.5/0.5 | 3/3 |
| Example 3-Pre-Mist | 3/2.5 | 4.5/4.5 | 2.5/2 | 3/4.5 |
| Example 3-IPA | 4/2 | 3/4 | 4/4 | 3/4 |
| Comparative Example 2 | 1.5/1 | 1/1 | 2/3.5 | 2.5/3.5 |
| Comparative Example 3 | 2/3.5 | 2.5/3.5 | 2/3.5 | 2.5/3.5 |
| Comparative Example 4 | 2.5/3 | 1.5/0.5 | 2.5/3.5 | 2/5 |
| Comparative Example 5 | 1.5/0.5 | 2/3 | 2.5/3 | 1/3 |

TABLE 2B

Hard Surface (Linoleum) Cleaning Test Results Obtained from Gretag Macbeth Color Eye 7000A

| Sample | L* | a* | b* | C* | h° | WI-GANZ | |
|---|---|---|---|---|---|---|---|
| Reference Linoleum Sample | 82.37 | −0.45 | 2.01 | 2.06 | 102.64 | 37.97 | % Soil |
| Name | DL* | Da* | Db* | DC* | Dh° | DEcmc | Removed |
| Control 2-Pre-Mist (S) | 0.09 | −0.02 | −0.08 | −0.07 | 0.04 | 0.11 | |
| Control 2-Pre-Mist (BC) | −43.01 | 28.60 | −54.37 | 57.39 | −21.94 | 82.06 | |

TABLE 2B-continued

Hard Surface (Linoleum) Cleaning Test Results
Obtained from Gretag Macbeth Color Eye 7000A

| Sample<br>Reference Linoleum Sample<br>Name | L*<br>82.37<br>DL* | a*<br>−0.45<br>Da* | b*<br>2.01<br>Db* | C*<br>2.06<br>DC* | h°<br>102.64<br>Dh° | WI-GANZ<br>37.97<br>DEcmc | <br>% Soil<br>Removed |
|---|---|---|---|---|---|---|---|
| Control 2-Pre-Mist (AC1) | −9.27 | −4.74 | −13.53 | 10.57 | 9.68 | 19.31 | 64.5 |
| Control 2-Pre-Mist (FC1) | −5.94 | −5.08 | −9.37 | 7.15 | 7.91 | 14.35 | 75.7 |
| Control 2-Water (S) | −0.06 | −0.02 | −0.10 | −0.09 | 0.04 | 0.13 | |
| Control 2-Water (BC) | −41.99 | 27.58 | −52.28 | 55.06 | −21.51 | 79 | |
| Control 2-Water (AC1) | −39.96 | 19.27 | −50.73 | 50.16 | −20.70 | 72.66 | 2.5 |
| Control 2-Water (FC1) | −38.48 | 15.56 | −48.54 | 46.86 | −20.07 | 68.34 | 4.4 |
| Example 4-Pre-Mist (S) | −0.08 | −0.03 | 0.03 | 0.03 | 0.02 | 0.06 | |
| Example 4-Pre-Mist (BC) | −43.21 | 28.33 | −52.88 | 55.94 | −21.66 | 80.21 | |
| Example 4-Pre-Mist (AC1) | −18.79 | −2.25 | −26.22 | 22.29 | 13.98 | 35.35 | 39.4 |
| Example 4-Pre-Mist (FC1) | −5.60 | −3.64 | −8.17 | 5.33 | 7.18 | 12.11 | 77.1 |
| Example 4-Water (S) | 0.04 | −0.01 | −0.08 | −0.07 | 0.02 | 0.1 | |
| Example 4-Water (BC) | −44.96 | 27.61 | −58.18 | 60.33 | −22.54 | 85.99 | |
| Example 4-Water (AC1) | −32.60 | 4.03 | −45.04 | 41.11 | 18.83 | 60.55 | 15.9 |
| Example 4-Water (FC1) | −20.62 | −2.67 | −29.40 | 25.50 | 14.87 | 39.59 | 37.1 |
| Example 5-Pre-Mist (S) | 0.15 | 0.03 | −0.02 | −0.02 | −0.02 | 0.07 | |
| Example 5-Pre-Mist (BC) | −43.29 | 29.42 | −52.21 | 55.89 | −21.62 | 80.14 | |
| Example 5-Pre-Mist (AC1) | −4.88 | −3.63 | −7.36 | 4.67 | 6.75 | 11.11 | 79.7 |
| Example 5-Pre-Mist (FC1) | −2.42 | −2.48 | −3.91 | 1.43 | 4.40 | 6.29 | 89.4 |
| Example 5-Water (S) | 0.05 | −0.04 | 0.04 | 0.05 | 0.03 | 0.07 | |
| Example 5-Water (BC) | −43.95 | 30.18 | −55.77 | 59.37 | −22.29 | 84.65 | |
| Example 5-Water (AC1) | −14.19 | −3.80 | −20.59 | 16.99 | 12.23 | 28.13 | 51.2 |
| Example 5-Water (FC1) | −2.14 | −1.90 | −3.14 | 0.54 | 3.63 | 5.02 | 90.7 |
| Example 6-Pre-Mist (S) | 0.09 | −0.01 | −0.03 | −0.03 | 0.02 | 0.06 | |
| Example 6-Pre-Mist (BC) | −39.94 | 23.17 | −50.41 | 51.40 | −20.88 | 74.21 | |
| Example 6-Pre-Mist (AC1) | −5.29 | −3.60 | −7.93 | 5.10 | 7.05 | 11.78 | 76.6 |
| Example 6-Pre-Mist (FC1) | −1.73 | −1.68 | −2.62 | 0.16 | 3.11 | 4.25 | 91.7 |
| Example 6-Water (S) | 0.17 | −0.06 | 0.05 | 0.07 | 0.05 | 0.13 | |
| Example 6-Water (BC) | −43.62 | 29.51 | −55.87 | 59.13 | −22.26 | 84.33 | |
| Example 6-Water (AC1) | −26.58 | 0.85 | −37.15 | 33.07 | 16.93 | 49.8 | 24.3 |
| Example 6-Water (FC1) | −6.90 | −3.18 | −10.21 | 6.90 | 8.17 | 14.45 | 72.7 |
| Example 7-Pre-Mist (S) | 0.07 | −0.03 | −0.04 | −0.04 | 0.04 | 0.07 | |
| Example 7-Pre-Mist (BC) | −41.19 | 25.65 | −51.86 | 53.79 | −21.30 | 77.34 | |
| Example 7-Pre-Mist (AC1) | −8.57 | −4.50 | −12.95 | 9.95 | 9.44 | 18.46 | 65.6 |
| Example 7-Pre-Mist (FC1) | −1.98 | −1.96 | −3.06 | 0.57 | 3.59 | 4.96 | 90.8 |
| Example 7-Water (S) | 0 | −0.03 | −0.08 | −0.07 | 0.05 | 0.11 | |
| Example 7-Water (BC) | −42.98 | 28.65 | −54.45 | 57.48 | −21.96 | 82.17 | |
| Example 7-Water (AC1) | −11.64 | −3.58 | −16.91 | 13.37 | 10.95 | 23.26 | 57.4 |
| Example 7-Water (FC1) | −2.33 | −1.78 | −3.52 | 0.63 | 3.89 | 5.39 | 89.7 |
| Example 8-Pre-Mist (S) | 0.08 | −0.02 | −0.05 | −0.04 | 0.03 | 0.08 | |
| Example 8-Pre-Mist (BC) | −41.99 | 27.36 | −52.91 | 55.51 | −21.60 | 79.58 | |
| Example 8-Pre-Mist (AC1) | −5.97 | −3.59 | −8.92 | 5.94 | 7.56 | 13.01 | 75.1 |
| Example 8-Pre-Mist (FC1) | −1.94 | −1.86 | −2.99 | 0.45 | 3.49 | 4.81 | 91.2 |
| Example 8-Water (S) | 0.15 | −0.06 | −0.04 | −0.02 | 0.06 | 0.11 | |
| Example 8-Water (BC) | −41.03 | 25.63 | −51.49 | 53.45 | −21.24 | 76.89 | |
| Example 8-Water (AC1) | −10.28 | −3.35 | −15.03 | 11.50 | 10.24 | 20.75 | 59.9 |
| Example 8-Water (FC1) | −2.36 | −2.08 | −3.68 | 0.97 | 4.11 | 5.76 | 89.1 |
| Comparative Example 1-Water (S) | −0.05 | 0.03 | −0.03 | −0.04 | −0.02 | 0.06 | |
| Comparative Example 1-Water (BC) | −42.62 | 27.93 | −54.18 | 56.90 | −21.86 | 81.41 | |
| Comparative Example 1-Water (AC1) | −44.13 | 27.18 | −55.60 | 57.82 | −22.07 | 82.71 | −1.7 |
| Comparative Example 1-Water (FC1) | −44.15 | 26.07 | −54.97 | 56.77 | −21.89 | 81.37 | −1.8 |
| Comparative Example 2-(S) | 0.05 | −0.01 | −0.01 | −0.01 | 0.01 | 0.03 | |
| Comparative Example 2-(BC) | −42.67 | 27.87 | −53.06 | 55.88 | −21.66 | 80.11 | |
| Comparative Example 2-(AC1) | −10.99 | −0.60 | −14.06 | 10.03 | 9.87 | 19.11 | 59.0 |
| Comparative Example 2-(FC1) | −4.45 | −2.48 | −6.25 | 3.09 | 5.97 | 9.16 | 81.1 |

Test 3: Hard Surface Cleaning of Staining Material on Hard Surfaces and Carpet Several hard surfaces were tested for cleaning efficiency according to the ASTM Method D 4488-95 described previously. The stains used include crayons (red, blue green, and yellow green) and blue permanent marker. The surfaces include linoleum (Armstrong® linoleum product #24876), countertop (Wilsonart Laminate, D30-60, Natural Almond 0610T), wallpaper (York wallcoverings; prepasted, scrubbable, strippable; pattern # PV5382), painted drywall (American Tradition interior 100% flat wall painted in Bermuda Sand), and carpet (medium grade white to off-white nylon 6,6 cut pile). The surfaces were tested for cleaning efficiency using cleaning wipes of the current invention and several commercially available cleaning wipes/sponges.

Example 9

The Celfil polyester substrate was screenprinted with a formulation comprising 32.4% Capture® powder, 7.0% Witcobond® W-293, 23.8% water, and 36.8% C5 starch (made from an 8% solution of C5 starch and water). This provided an approximate ratio of % Capture® to % binding agent to % Capture® Pre-Mist of about 50:10:40. Screenprinting was accomplished using a 40 mesh size screen. Viscosity of print paste was about 4200 cps.

Test results are shown in Table 3A and Table 3B. Example 9 was wet with Capture® Pre-Mist prior to use. Each of the Comparative Examples was used as directed on the label. The stained surfaces were cleaned until it was apparent that no additional stain was being removed from the surface.

TABLE 3A

Hard Surface Cleaning Results For Crayon on Various Hard Surfaces and Carpet

| Sample ID | Linoleum | Countertop | Wallpaper | Painted Drywall | Carpet |
|---|---|---|---|---|---|
| Control 1 | 0 | 0 | 0 | 0 | 0 |
| Example 9 | 5 | 5 | 5 | 5 | 4.5 |
| Comparative Example 2 | 1.5 | 3.5 | 4.5 | 3.5 | n/a |
| Comparative Example 7 | n/a | n/a | n/a | n/a | 3.5 |
| Comparative Example 8 | 5 | 5 | 5 | 5 | n/a |

TABLE 3B

Hard Surface Cleaning Results For Blue Permanent Marker on Various Hard Surfaces

| Sample ID | Linoleum | Countertop | Painted Drywall |
|---|---|---|---|
| Control | 0 | 0 | 0 |
| Example 9 | 5 | 4 | 2 |
| Comparative Example 2 | 1 | 2 | 1.5 |
| Comparative Example 8 | 4 | 4.5 | 4.5 |

Test 4: Textile Substrate Cleaning (Carpet and Upholstery)

Carpeting and automotive upholstery were stained and then cleaned according to the AATCC Test Method 175-1992 described previously. The carpeting was a light tan color. The automotive upholstery fabric was a dark gray color. Example 3, as described previously, was used for testing on the carpet and upholstery samples.

Test results for carpet are shown in Table 4A. Test results for automotive upholstery are shown in Table 4B. The Control was wet with Capture® Pre-Mist ("Pre-Mist) prior to use. Example 3 was wet with Capture® Pre-Mist ("Pre-Mist) prior to use. Each of the Comparative Examples was used as directed. Each sample was cleaned once.

TABLE 4A

Textile Substrate (Carpet) Cleaning Results

| Sample ID | Red Clay | Synthetic Dirt | Red Wine | Ketchup | Concealer |
|---|---|---|---|---|---|
| Control 2 | 4 | 3 | 4 | 4 | 2.5 |
| Example 3-Pre-Mist | 4.5 | 4.5 | 4.5 | 4 | 3 |
| Comparative Example 6 | 4 | 4.5 | 4.5 | 4 | 2.5 |
| Comparative Example 7 | 4.5 | 5 | 5 | 3.5 | 2 |

TABLE 4B

Textile Substrate (Automotive Upholstery) Cleaning Results

| Sample ID | Red Clay | Synthetic Dirt | Ketchup | Concealer |
|---|---|---|---|---|
| Control 2 | 4 | 1.5 | 4.5 | 2 |
| Example 3-Pre-Mist | 4.5 | 4.5 | 4.5 | 2.5 |
| Comparative Example 6 | 4 | 4.5 | 4.5 | 2.5 |
| Comparative Example 7 | 4.5 | 3.5 | 4.5 | 4 |

Test 5: Textile Substrate Cleaning (YES® Essentials upholstery and floor mats)

Automotive floor mats and upholstery fabric, each known by the tradename YES® Essentials available from Milliken & Company, were tested for cleaning efficiency using various staining materials according to AATCC Test Method 130 (modified) as described previously. The automotive upholstery fabric was a dark gray color.

Example 10

The Celfil polyester substrate was screenprinted with a formulation comprising 35.6% Capture® powder, 8.4% Witcobond® W-293, 28.6% water, and 27.5% C5 starch (made from an 8% solution of C5 starch and water). This provided an approximate ratio of % Capture® to % binding agent to % Capture® Pre-Mist of about 50:10:40. Screenprinting was accomplished using a 40 and a 125 mesh size screen. Viscosity of print paste was about 4400 cps.

Test results for floor mats are shown in Table 5A. Test results for upholstery fabric are shown in Table 5B. Example 10 was wet with both Capture® Pre-Mist and a solution of 20% isopropyl alcohol prior to use. For the Comparative Examples, the Mopar® products were applied directly to the stain and cheesecloth was used for stain removal.

TABLE 5A

YES ® Essential Automotive Floor Mats Cleaning Results

| Sample ID | Ketchup | Mustard | Burned Motor Oil | Permanent Marker |
|---|---|---|---|---|
| Control 1 | 0 | 0 | 0 | 0 |
| Example 10 | 4.5 | 2 | 5 | 4.5 |
| Comparative Example 6 | 5 | 2 | 4 | 3 |
| Comparative Example 9 | 1 | 2 | 5 | 2 |
| Comparative Example 10 | 4.5 | 2.5 | 5 | 3.5 |

TABLE 5B

| YES ® Essential Automotive Upholstery Cleaning Results | | | | |
|---|---|---|---|---|
| Sample ID | Ketchup | Mustard | Burned Motor Oil | Permanent Marker |
| Control | 0 | 0 | 0 | 0 |
| Example 10 | 5 | 4.5 | 3.5 | 5 |
| Comparative Example 6 | 4 | 5 | 3 | 3.5 |
| Comparative Example 9 | 1 | 1 | 5 | 2.5 |
| Comparative Example 10 | 5 | 4.5 | 4 | 4 |

Test 6: Cleaning Efficiency of Various Hard Surfaces Using Cleaning Implement Various hard surfaces were tested for cleaning efficiency using various staining materials. The cleaning wipes of the present invention were attached to a cleaning implement commercially available and known as a Swiffer® floor mop (available from Procter & Gamble). The cleaning efficiency of the inventive wipes was tested in both the dry and wet state. In the dry state, the inventive cleaning wipe was attached to the Swiffer® floor mop (Swiffer® wipe was present). In the dry state, testing on laminate flooring was done with a Swiffer® wipe present; on linoleum, no Swiffer® wipe was present. In the wet state, the inventive cleaning wipe was attached to the Swiffer® floor mop; the Swiffer® wet pad was present, except for testing red clay on linoleum (Capture® Pre-Mist was used). Tests with the Swiffer® WetJet used the cleaning solution provided. Testing was also performed using Capture® Pre-Mist in place of the Swiffer® WetJet cleaning solution. The cleaning efficiency of the inventive wipes was tested against the Swiffer® wet mop, Swiffer® dry mop, and Swiffer® WetJet. All of the Swiffer® products were used as directed for the test.

Example 11

The Celfil polyester substrate was screenprinted with a formulation comprising 35.6% Capture® powder, 8.4% Witcobond® W-293, 28.6% water, and 27.5% C5 starch (made from an 8% solution of C5 starch and water). This provided an approximate ratio of % Capture® to % binding agent to % water of about 50:10:40. Screenprinting was accomplished using a 40 and a 125 mesh size screen. Viscosity of print paste was about 4400 cps.

The test materials include: (a) Armstrong® linoleum flooring Signia Collection Santana Fieldstone Tiza A1360 and (b) laminate flooring Kronotex Swiftlock Plus Elegance Oak Laminate Model D744WG.

Test results for the dry cleaning wipes are shown in Table 6A. The results showed that all of the cat hair was picked up with the initial cleaning. However, for both samples, a clean second wipe was needed in order to remove the red clay particles.

Test results for the wet cleaning wipes are shown in Table 6B. Blue and red crayon were used for the waxy stain on linoleum. Black, red, and blue permanent markers were also used.

Test results using the Swiffer® WetJet cleaning implement are shown in Table 6C.

TABLE 6A

| Hard Surface Cleaning Results With Dry Wipes on Cleaning Implement | | |
|---|---|---|
| Sample ID | Laminate Flooring Cat Hair and Red Clay Initial cleaning/ Final cleaning | Linoleum Cat Hair and Red Clay Initial cleaning/ Final cleaning |
| Example 11 | 2.5/5 | 4/5 |
| Swiffer ® Dry | 2/4.5 | 4/4.5 |

TABLE 6B

| Hard Surface Cleaning Results With Wet Wipes on Cleaning Implement | | | | | | | | |
|---|---|---|---|---|---|---|---|---|
| Sample ID | Hardwood Red Clay | Hardwood Scuff Marks | Hardwood Muddy Footprints | Linoleum Red Clay | Linoleum Scuff Marks | Linoleum Muddy Footprints | Linoleum Crayon Blue/Red | Linoleum Permanent Markers |
| Example 11-Swiffer ® wet | 5 | 5 | 5 | n/a | 5 | 5 | 5/5 | 2.5 |
| Example 11-Pre-Mist | n/a | n/a | n/a | 5 | n/a | n/a | 5/5 | 2 |
| Swiffer ® Wet | 5 | 4 | 5 | 5 | 4 | 5 | 4/4 | 1.5 |

TABLE 6C

| Hard Surface Cleaning Results With WetJet Cleaning Implement | | |
|---|---|---|
| Sample ID | Hardwood Scuff Marks | Linoleum Scuff Marks |
| Example 11 | 5 | 5 |
| Swifter ® WetJet | 4 | 4 |

Example 12

The Celfil polyester substrate was screenprinted with a formulation comprising 21.6% microcrystalline cellulose powder (available from Sigma Aldrich), 5.7% Witcobond® W-293, 55.6% water, and 17.07% C5 starch (from an 8% solution of C5 starch and water). This provided an approximate ratio of % cellulose to % binding agent to % water of 26:7:67. Screenprinting was accomplished using a 40 mesh screen. Viscosity of the print paste was about 1400 cps.

Example 13

The Celfil polyester substrate was padded with a formulation comprising 4.8% ground Mr. Clean Magic Eraser® (distributed by Procter & Gamble), 47.6% Witcobond® W-293, and 47.6% water. Padding was accomplished by spreading the material onto the polyester substrate, placing the material under the padder (although this is not necessary), and then placing the sample into a Despatch oven for drying/curing for 3 minutes at 350 degrees F.

Example 14

The Celfil polyester substrate was foamed with a formulation comprising 28.4% UF polymer particles, 28.4% Witcobond® W-293, 3.0% Mykon® NRW-3, and 40.6% water. Foaming was accomplished by setting the foamer at 10 ypm with a liquid flow of 0.048 L/min. The samples were then dried/cured in a vertical oven for 60 seconds at 310 degrees F.

Example 15

A 100% cotton substrate was screenprinted with a formulation comprising 27.4% Capture® powder, 36.5% PrintRite® 595, 9.1% water, 26.9% C5 starch (from an 8% solution of C5 starch and water). Screenprinting was accomplished using a 40 mesh screen. Viscosity of the print paste was about 4200 cps.

Example 16

The Celfil polyester substrate was screenprinted with a formulation comprising 27.4% Capture® powder, 36.5% PrintRite® 595, 9.1% water, and 26.9% C5 starch (from an 8% solution of C5 starch and water). Screenprinting was accomplished using a 40 mesh screen. Viscosity of the print paste was about 4200 cps.

Example 17

A 60% cotton, 40% polyester substrate was screenprinted with a formulation comprising 27.4% Capture® powder, 36.5% PrintRite® 595, 9.1% water, and 26.9% C5 starch (from an 8% solution of C5 starch and water). Screenprinting was accomplished using a 40 mesh screen. Viscosity of the print paste was about 4200 cps.

Example 18

The Celfil polyester substrate was screenprinted with a formulation comprising 27.8% Capture® powder, 37.1% PrintRite® 595, 27.1% water, and 8.1% Acrysol 8306. Screenprinting was accomplished using a 40 mesh screen. Viscosity of the print paste was about 7400 cps.

Examples 19

This Example is provided to illustrate, on a laboratory scale, a method for adding the cleaning composition of the present invention to a paper substrate. The procedure is described below.

The following equipment was utilized for this procedure:

Wooden pour mold
Nylon mesh paper making screen
Coarsely woven blotting screen
Plastic drain grid
Couching pads (absorbent pads to quickly pull water out of paper)
Sponge
Clean, white 65/35 poly cotton fabric swatches
Household iron
Household blender—12 speed
Dishpan
1 liter beaker
Wooden press bar Preparation of Control Samples:

1. Tear 5.0 g+/−0.05 g of source paper (e.g. paper towels) into small pieces.
2. Add the paper to approximately 350 ml of tap water and allow to soak 3 minutes.
3. Assemble mold/papermaking screen and drain grid. These are held together with Velcro straps.
4. Place the assembled mold, drain grid down, into a dishpan containing enough water to cover the mold up to within ¼ inch of the top of the mold sides.
5. Add the paper/water mixture to the blender.
6. Add an additional 350 ml of tap water.
7. Blend on "High/Blend" setting for 30 seconds.
8. Pour the water/paper mixture into the mold.
9. Agitate the mixture with fingers or plastic utensil to get a uniform mix across the screen surface.
10. Holding the mold level, lift from the water. The mold surface should have a fairly uniform covering of paper.
11. Loosen the Velcro straps and carefully lift the mold off of the paper making screen. This leaves the sheet of paper on top of the paper making screen and drain grid.
12. Place the blotting screen on top of the sheet of paper and blot the surface of the paper evenly with the sponge to remove as much excess water as possible.
13. Remove blotting screen.
14. Place a couching pad on a clean dry uniform surface. Turn the sheet and paper making screen over onto the couching pad. This results in the paper sheet being sandwiched between the papermaking screen on top and the blotting pad on bottom.
15. Blot the screen uniformly with the sponge to remove excess water.
16. Remove the papermaking screen from on top of the paper sheet and the couching pad.
17. Place a couching pad on top of the paper sheet.
18. Press down over the paper surface uniformly with the press bar to remove as much water as possible.
19. Carefully remove the paper sheet from between the couching pads and place it between two of the cloth swatches.
20. Iron (set on high, no steam) with uniform pressure across the paper surface until paper feels dry to the touch.

Preparation of Inventive Samples:

Follow the same procedure as described above for the Control Samples, except that UF polymer particles were added to the water in Step #6 and stirred to dissolve/disperse before the mixture was added to the blender.

The Control and Inventive paper towels were tested for their ability to remove stains according to the following procedure: A blue Sharpie® permanent marker was applied to linoleum flooring (Armstrong® Landmark collection, Rosedale Delft/White, Product #24876). The marker stain was allowed to sit for 24 hours. The paper towel was wet with water and the stain was cleaned for two minutes with the wet paper towel. The paper towel was then allowed to dry. Visual observation of stain removal was then made using a stain rating scale rating of 0 to 5 (0=no cleaning; 5=complete removal of stain). The test results are shown in Table 7.

TABLE 7

| Stain Removal Using Paper Towels | | |
|---|---|---|
| Sample ID | Generic Brand Paper Towel | Bounty ® Paper Towel |
| Control | 0 | 0 |
| 3% UF Polymer Particles | 3 | 0 |
| 5% UF Polymer Particles | 0.5 | 1.5 |
| 10% UF Polymer Particles | 2 | 2.5 |

The above examples serve to illustrate that the addition of particulates, including, but not limited to U/F polymer particles, improves the cleaning performance of wipes compared to wipes without particulates. The benefits of adding particulates, including, but not limited to U/F polymer particles, is their high affinity for particulates, grease and oil stains, as well as, providing abrasive (mechanical) cleaning action without damaging the surfaces being cleaned. These wipes do not solely rely on surfactants to provide cleaning and, as such, may be used either dry or wet.

These and other modifications and variations to the present invention may be practiced by those of ordinary skill in the art, without departing from the spirit and scope of the present invention. Furthermore, those of ordinary skill in the art will appreciate that the foregoing description is by way of example only, and is not intended to limit the scope of the invention described in the appended claims.

We claim:

1. A cleaning device comprising:

(a) urea formaldehyde as an absorbent particulate, wherein said absorbent particulate has an average particle size of from about 1 to about 300 microns in diameter and an on absorption value of at least 40 and a Moh's hardness value of less than or equal to 3;

(b) at least one polyurethane-containing or polyester-containing binding agent; and (c) a textile substrate.

2. The cleaning device of claim 1, wherein said average particle size of said absorbent particulate is from about 1 to about 200 microns.

3. The cleaning device of claim 1, wherein said average particle size of said absorbent particulate is from about 1 to about 105 microns.

4. The cleaning device of claim 1, wherein said average particle size of said absorbent particulate is from about 35 to about 105 microns.

5. The cleaning device of claim 1, wherein said textile substrate is a fabric comprised of fibers and yarns selected from the group consisting of synthetic fibers, natural fibers, and mixtures thereof.

6. The cleaning device of claim 5, wherein said natural fibers are selected from the group consisting of wool, cotton, flax, silk and mixtures thereof.

7. The cleaning device of claim 5, wherein said synthetic fibers are selected from the group consisting of polyester, acrylic, polyamide, polyolefin, polyaramid, polyurethane, regenerated cellulose, and mixtures thereof.

8. The cleaning device of claim 5, wherein said textile substrate is a fabric and wherein said fabric is selected from the group consisting of woven fabric, knitted fabric, and nonwoven fabric.

9. The cleaning device of claim 8, wherein said textile substrate is a nonwoven fabric comprised of polyester fibers or yarns.

10. The cleaning device of claim 1, wherein said device further includes at least one thickening agent.

11. The cleaning device of claim 10, wherein said thickening agent is present in an amount to adjust the viscosity of the cleaning composition to between about 100 cps and about 10,000 cps.

12. The cleaning device of claim 10, wherein said thickening agent is present in an amount to adjust the viscosity of the cleaning composition to between about 1000 cps and about 5000 cps.

13. The cleaning device of claim 10, wherein said thickening agent is selected from the group, consisting of starches, gums, guars, alginates, polyacrylates, clays, synthetic thickening agents, and mixtures thereof.

14. The cleaning device of claim 13, wherein said thickening agent is starch.

15. The cleaning device of claim 1, wherein said device further includes one or more additives selected from the group consisting of wetting agents, organic solvents, adhesives, surfactants, optical brighteners, re-soiling inhibitors, antimicrobial agents, bleaching agents, anti-dusting agents, anti-static agents, preservatives, and perfumes.

* * * * *

UNITED STATES PATENT AND TRADEMARK OFFICE

CERTIFICATE OF CORRECTION

PATENT NO. : 8,258,066 B2
APPLICATION NO. : 11/394963
DATED : September 4, 2012
INVENTOR(S) : Emily W. Michaels et al.

It is certified that error appears in the above-identified patent and that said Letters Patent is hereby corrected as shown below:

In Column 27, line 35, after "an" and before "absorption", delete "on" and add --oil--.

Signed and Sealed this
Sixth Day of November, 2012

David J. Kappos
*Director of the United States Patent and Trademark Office*